(12) United States Patent
Liao

(10) Patent No.: US 10,039,125 B2
(45) Date of Patent: Jul. 31, 2018

(54) DATA COMMUNICATION METHOD AND NETWORK DEVICE USING THE METHOD

(71) Applicant: AMBIT MICROSYSTEMS (SHANGHAI) LTD., Shanghai (CN)

(72) Inventor: Peng-Yu Liao, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 134 days.

(21) Appl. No.: 15/212,295

(22) Filed: Jul. 18, 2016

(65) Prior Publication Data

US 2018/0020463 A1    Jan. 18, 2018

(51) Int. Cl.
*H04W 72/12* (2009.01)
*H04B 7/06* (2006.01)
*H04W 74/08* (2009.01)
*H04W 84/12* (2009.01)

(52) U.S. Cl.
CPC ...... *H04W 72/1231* (2013.01); *H04B 7/0617* (2013.01); *H04B 7/0626* (2013.01); *H04B 7/0634* (2013.01); *H04W 74/0816* (2013.01); *H04W 84/12* (2013.01)

(58) Field of Classification Search
CPC ......... H04W 72/1231; H04W 74/0816; H04W 84/12; H04B 7/0617; H04B 7/0626; H04B 7/0634
See application file for complete search history.

(56) References Cited

U.S. PATENT DOCUMENTS

| 2007/0223413 A1* | 9/2007 | Igarashi | H04B 1/0475 370/310.2 |
| 2014/0187255 A1* | 7/2014 | Dimou | H04W 72/082 455/452.2 |
| 2014/0301216 A1* | 10/2014 | Immendorf | H04W 24/08 370/252 |
| 2016/0088617 A1* | 3/2016 | Goldhamer | H04L 1/18 370/330 |
| 2016/0165630 A1* | 6/2016 | Oteri | H04W 74/04 370/336 |

* cited by examiner

*Primary Examiner* — Ian N Moore
*Assistant Examiner* — Ronald h Davis
(74) *Attorney, Agent, or Firm* — ScienBiziP, P.C.

(57) ABSTRACT

A data communication method is disclosed for reducing cross interference between mobile devices as clients served by networks and network devices which have overlapping coverage. A first network device includes a first client list and a first communication schedule and the first network device communicates with other overlapping network devices to obtain a second client list and a second communication schedule The first communication schedule is adjusted according to the obtained second client list and second communication schedule to avoid signal interference by interfering clients.

20 Claims, 8 Drawing Sheets

DATA COMMUNICATION METHOD AND NETWORK DEVICE USING THE METHOD

FIELD

The subject matter herein generally relates to wireless communications.

BACKGROUND

As wireless local area network (WLAN) and Wi-Fi technologies are widely used, the network environment becomes more and more complicated. A client of one WLAN may be located in signal coverage of one or more other WLANs, which may result in more interferences, spectral inefficiencies, and lower data throughput. For example, in a multi-client broadband wireless (e.g., WIFI) environment (e.g., a business center, an office, a hotel, a hospital, etc.), each client may act as a source of noise (e.g., interference) for other clients. In such an example, that interference may reduce data throughput for each client.

FIG. 1 illustrates an exemplary embodiment of a simple network environment including a WLAN composed of a traditional network device X and a client x. Data can be transferred with the maximum bandwidth between the traditional network device X and the client x without signal interference. FIG. 2 illustrates an exemplary embodiment of a complicated network environment including the same WLAN and another WLAN composed of a traditional network device Y and a client y. Both the client x and client y are in an overlapping area of the signal coverage of the traditional network device X and that of the traditional network device Y. Multiple transmissions of two or more clients are not allowed under a single signal coverage area according to the existing wireless transmission protocol. Thus, compared to the single simple network environment illustrated in FIG. 1, available network bandwidth between the traditional network device X and the client x may be in fact reduced to half of the maximum bandwidth, as well as in theory. Available network bandwidth between the traditional network device Y and the client y may also be reduced to half of original bandwidth. It is noted that the illustrated embodiment is merely an example and is not intended to be limiting.

Improving efficiency of data transmission in complicated network environments is desirable.

BRIEF DESCRIPTION OF THE DRAWINGS

Implementations of the present technology will now be described, by way of example only, with reference to the attached figures.

DETAILED DESCRIPTION

Figure 1:
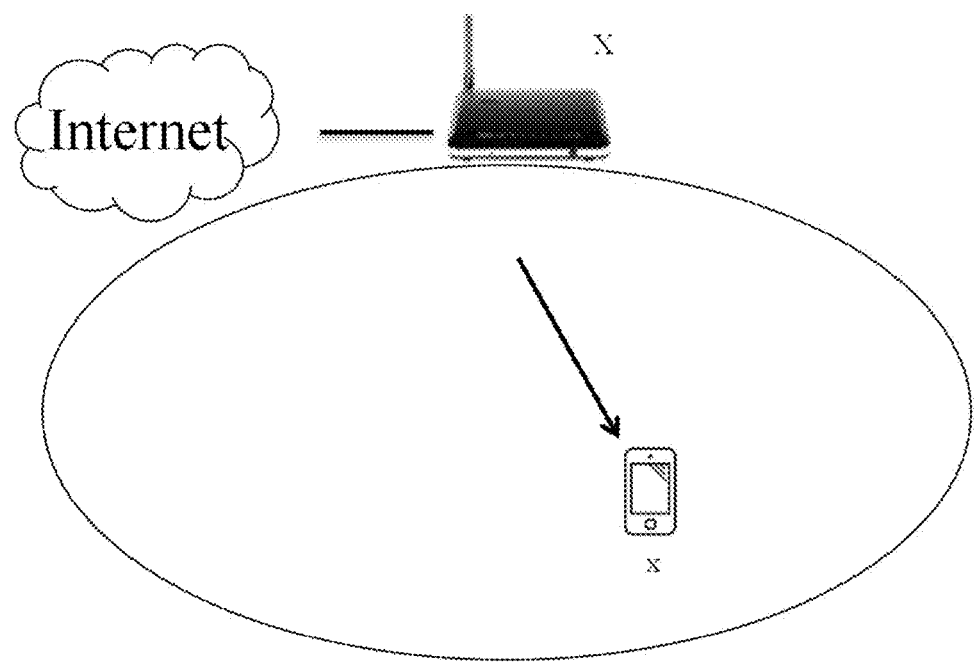
FIG. 1 illustrates a simple network environment including a WLAN.
Figure 2:
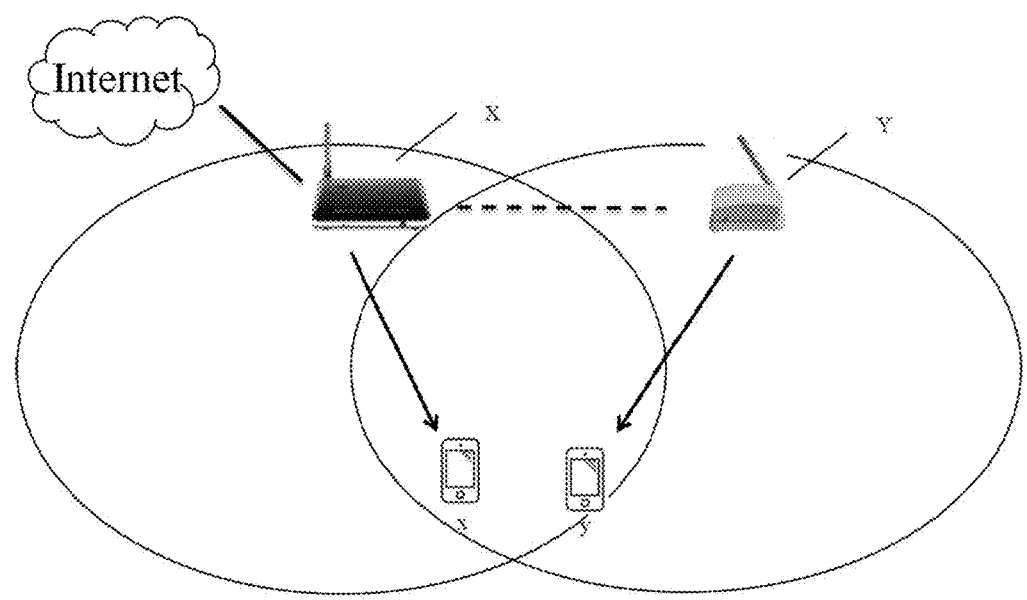
FIG. 2 illustrates a network environment which is complicated because it includes two WLANs.

For simplicity and clarity of illustration, where appropriate, reference numerals have been repeated among the different figures to indicate corresponding or analogous elements. In addition, numerous specific details are set forth in order to provide a thorough understanding of the embodiments described herein. However, it is understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Figure 3:
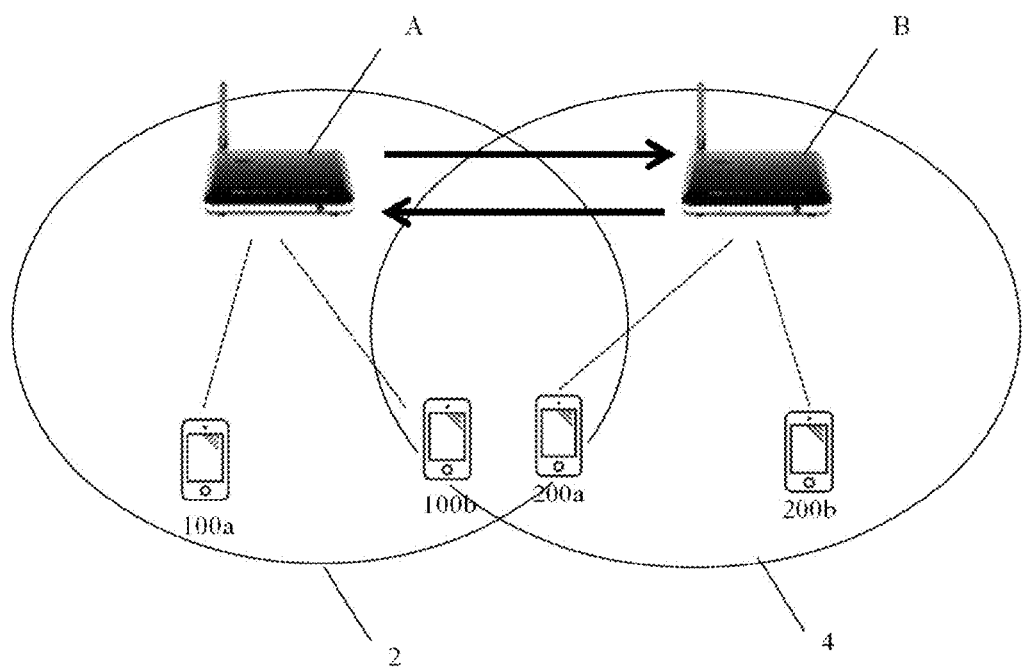
FIG. 3 illustrates an exemplary embodiment of a network environment of network devices in accordance with the present disclosure.

FIG. 3 illustrates a network environment of network devices accordance with the present disclosure. In the embodiment, there are at least two wireless local area networks (WLANs), for example, a first WLAN and a second WLAN, in the network environment. Wherein, the first WLAN includes a first network device A and at least one first client (e.g., 100a, 100b), the second WLAN includes a second network device B and at least one second client (e.g., 200a, 200b). The communication between the first network device A and the first clients and between the second network device B and the second clients can be based on a standard or non-standard protocol, for example, 802.XXX standard.

The first network device A and the second network device B may be routers, extenders, repeaters, gateway, access points for wireless networking, and the like. The clients (e.g., 100a, 100b, 200a, 200b) may be electronic devices which support wireless network functions, for example, set top boxes, mobile phones, tablet personal computers, laptop computers, and Smart TVs.

The embodiments herein only provide the first network device A and the second network device B. The present disclosure can be adapted to network environments including more than two network devices. In other words, the first network device A and the second network device B are not limiting in the present disclosure. In one embodiment, the first network device A may communicate with the second device B via wired or wireless communication methods.

The embodiments herein only provide the first clients 100a, 100b and the second clients 200a, 200b. The present disclosure can be adapted to network environments including more than four clients. In other words, the first network device A may connect with more or less than two first clients likewise for the second network device B.

In the embodiment, both the first client 100b and the second client 200a are in an overlapping area of signal coverage of the first network device A and of the second network device B. The first client 100b and the second client 200a may be moving, the illustrated embodiment is merely an example and is not intended to be limiting.

In the embodiment, by signal scanning, the first network device A may search for other network devices (e.g., the second network device B) under signal coverage of the first network device A. The first network device A also may search for all clients (e.g., 100a, 100b, and 200a) under signal coverage of the first network device A using the same method. Obviously the second client 200a can act as an interference client for the first WLAN (namely, the first network device A). Each client may act as an interference source in relation to other clients, network devices, and WLANs.

In the embodiment, the first network device A includes a first client list. The first client list records one or more first clients (e.g., 100a, 100b) wirelessly connecting with the first network device A. The second network device B includes a second client list, the second client list records one or more second clients (e.g., 200a, 200b) wirelessly connecting with the first network device B. The first network device A retrieves the second client list from the second network device B, and determines whether there is a client (e.g., 200a) acting as a source of interference for the first network device A in the second client list. Hereinafter, the prefix "IS . . . " before a client designation (e.g. IS200a in the above determination) indicates a client which is or can be a source of interference to another client. In one embodiment, the second network device B also may retrieve the first client list from the first network device A, and determine whether there is an interference source (e.g., IS100b) for the second network device B in the first client list.

In the embodiment, the first network device A includes a first communication schedule. The second network device B includes a second communication schedule. The second communication schedule includes a third communication schedule for IS200a. The first network device A retrieves the second communication schedule from the second network device, and determines whether the first network device A is affected by signal interference from IS200a when data communication between the first network device and a third client (e.g., 100a or 100b) of the first clients is being performed. The first network device A adjusts the first communication schedule according to the result of determination, for avoiding signal interference from IS200a and improving the efficiency of data transmission. The first network device A avoids signal interference from IS200a when the data communication between the first network device and a third client (e.g., 100a or 100b) of the first clients is being performed. Data communication between the second network device B and the second clients (e.g., 200a or 200b) is not affected by signal interference from the third client (e.g., 100b). Thus, the efficiency of data transmission between the second network device B and the second clients (e.g., 200a or 200b) is also improved.

In one embodiment, the first network device A determines whether there is conflict regarding time segments as the first network device A is communicating with the third client (e.g., 100a or 100b) while the second network device B is communicating with IS200a. In other words, the first network device A finds out one or more time segments during which the first network device A communicates with the third client (e.g., 100a or 100b) and simultaneously the second network device B communicates with IS200a. If there is conflict regarding a first time segment (e.g., time m), the first network device A can be affected by signal interference from IS200a within time m. Namely, the data transmission between the first network device A and the third client (e.g., 100a or 100b) is affected by interference from IS200a within time m. If there is no conflict within a second time segment (e.g., time n), the first network device A is not affected by interference from IS200a within time n. Namely, the data transmission between the first network device A and the third client (e.g., 100a or 100b) is not affected by signal interference of IS200a in the time n.

In one embodiment, when determining that data transmission between the first network device A and the third client (e.g., 100a or 100b) is affected by signal interference from IS200a in time m, the first network device A adjusts the first communication schedule to avoid signal interference by IS200a. In one embodiment, the adjusting operation may refer to parameters for antennas, or times of transmission, or queuing being adjusted.

In one embodiment, the first network device A can adjust parameter for each antenna of the first network device A. The first network device A performs coherence beamforming to the third client (e.g., 100a or 100b) and performs null-beamforming to IS200a to obtain a first pre-coding matrix for the first time segment. For example, the first network device A can perform beam forming process for directing a coherence beam toward the third client (e.g., 100a or 100b) and directing a null beam toward IS200a.

In one embodiment, if the first network device A communicates with the third client 100b in the time m according to the first communication schedule, the first network device A will execute operations hereinafter described in the time m, for obtaining the first pre-coding matrix corresponding to the time m.

(1) the first network device A monitors packets from the third client 100b and packets from IS200a to retrieve first channel status information (CSI) between each of the antennas and the third client 100b and second CSI between each of the antennas and IS200a.

(2) the first network device A calculates a null-space corresponding to IS200a based on the second CSI between each of the antennas and IS200a, the formula being:

$$P_{21}*CSI_{21}+P_{22}*CSI_{22}+\ldots+P_{2N}*CSI_{2N}=0;$$

Wherein, $CSI_{21}$, $CSI_{22}$ . . . $CSI_{2N}$ represent second CSI between each of antennas 1~N and IS200a. $P_{21}, P_{22} \ldots P_{2N}$ represent parameters generated from nulling operations toward IS200a, the combination of which forms a null-space.

(3) the first network device A calculates a coherence beam-forming matrix corresponding to the third client 100b based on the first CSI between each of the antennas and the third client 100b, the formula being:

$$Max|P_{11}*CSI_{11}+P_{12}*CSI_{12}+\ldots+P_{1N}*CSI_{1N}|;$$

Wherein, $CSI_1$, $CSI_2$ ... $CSI_N$ represent first CSI between each of antennas 1~N and the third client 100b. $P_{11}$, $P_{12}$ ... $P_{1N}$ represent parameters generated from coherence beam-forming operations toward the third client 100b, the combination of which forms a coherence beam-forming matrix.

(4) the first network device A projects the coherence beam-forming matrix onto the null space to generate a vector matrix. The vector matrix can be regarded as the first pre-coding matrix.

In another embodiment, when determining that data transmission between the first network device A and the third client (e.g., 100b) is affected by signal interference from (e.g.) IS200a within time m, the first network device A may adjust transmitting times or queuing for the third client (e.g., 100b) to enable the first network device A to not be in communication with the third client (e.g., 100b) during time m.

When determining that the data transmission between the first network device A and the third client (e.g., 100a or 100b) is not affected by signal interference from IS200a for example, during second time segment (e.g., time n), the first network device A may perform coherence beamforming to the third client (e.g., 100a or 100b) and not perform null-beamforming to IS200a, to obtain a second pre-coding matrix for time n. In other words, the first network device A does not need to perform beam forming process for directing to a null beam toward IS200a.

In one embodiment, when determining that data transmission between the first network device A and the third client (e.g., 100b) is not affected by signal interference from IS200a in time n, the first network device A can adjust transmission time or queuing for the other client (e.g., 100a) of the first clients in time n. The first client 100a is out of signal coverage of the second network device B. The first client 100a will be outside and not affect data transmission between the second network device B and the second client (e.g., 200a or 200b) in time n.

The relation between the first network device A and the second network device B may be equal or non-equal in terms of authority. In one embodiment, the first network device A also can transmit the first client list and the first communication schedule to the second network device, and the second network device B is able to adjust the second communication schedule based on the first client list and the first communication schedule.

In one embodiment, when a unicast transmission is enabled between the first network device A and the third client (e.g., 100a or 100b) and between the second network device B and (e.g. IS200a, the first network device A can terminate a carrier sense multiple access with collision avoidance (CSMA/CA) mechanism, and synchronize a first rollback count value of the first network device with a second rollback count value of the second network device, or reset the first rollback count value and the second rollback count value to zero. The above operations can overcome defects of the CSMA/CA mechanism, so that simultaneous transmissions of two or more clients can be allowed in a single signal coverage area and utilization of network bandwidth is improved.

In one embodiment, the first network device A can set time of arbitration inter-frame spacing (AIFS) to a sum of time of distributed inter-frame spacing (DIFS) and ½ time of contention window (CW), that is AFIS=DIFS+CW/2.

Figure 4:
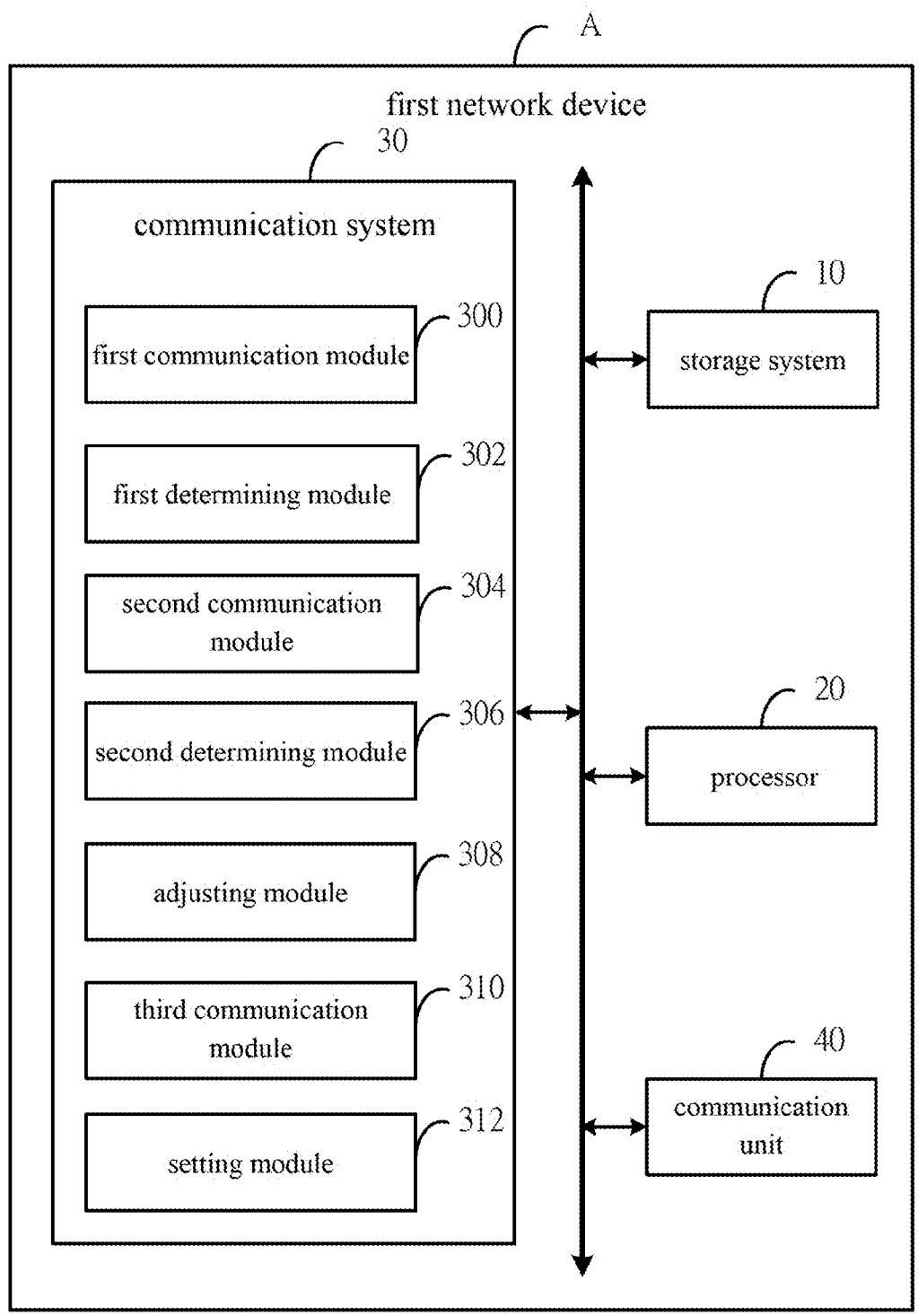
FIG. 4 illustrates a block diagram of an embodiment of functional modules of a network device in accordance with the present disclosure.

FIG. 4 illustrates a (first) network device A in accordance with the present disclosure. The embodiment also provides a second network device B for introducing functions and functioning of the first network device A. The functions of the second network device B may be similar to those of the first network device A. The first network device A is able to independently or simultaneously communicate with other network devices which support the functions of the first network device A.

In one embodiment, the first network device A includes at least one processor 10, a storage system 20, a communication system 30, and a communication unit 40. The communication system 30 includes an first communication module 300, a first determining module 302, a second communication module 304, a second determining module 306, an adjusting module 308, a third communication module 310, and a setting module 312. The adjusting module 308 includes a monitoring module 308a, a first calculating module 308b, a second calculating module 308c, and an third calculating module 308d. The modules 300-312 can include computerized code in the form of one or more programs that are stored in the storage system 20. The computerized code includes instructions that are executed by the at least one processor 10 to provide functions for the modules 300-312. In at least one embodiment, the storage system 20 may include a hard disk drive, a flash memory, a cache, or another computerized memory device. In one embodiment, the storage system also stores a first communication schedule and a first client list. The first client list records one or more first clients (e.g., 100a, 100b) which are in wireless connection with the first network device A.

The first communication module 300 retrieves a second client list from at least one nearby second network device (e.g., B). The second client list records one or more second clients (e.g., 200a, 200b) connecting with the second network device B. In the embodiment, the second network device B may be in signal coverage of the first network device A, or may be in an area where signal strength of the first network device A is greater than a pre-set value.

The first determining module 302 determines whether there is an interfering client (e.g., IS200a) recorded in the second client list. IS200a may be in signal coverage of the first network device A, or may be in an area where the signal strength of the first network device A is greater than a pre-set value. In other words, if a client is in the signal coverage area of the first network device A, such client (e.g., IS200a) is seen as an interference source for the first network device A. In one embodiment, through signal scanning, the first network device A can search for all clients not in connection with the first network device A. Any clients found may be compared with the second client list, for determining interfering clients such as IS200a.

The second communication module 304 retrieves a second communication schedule from the second network device B. The second communication schedule includes a third communication schedule for the interfering client (e.g. IS200a). The first, second, or third communication schedule may include, for example, transmission objects, interval, rollback count value (slot), CSMA/CA protocol, and/or pre-coding matrix indication.

The second determining module 306 determines whether the first network device A is affected by IS200a, based on the first communication schedule and the third communication schedule when data communication between the first network device and a third client (e.g., 100a or 100b, hereinafter each is a "desired client") of the first clients is being performed.

In the embodiment, the second determining module 306 determines whether there is conflict in one or more time segments as the first network device A is communicating with the desired client while the second network device B is communicating with the interfering client (e.g., IS200a). If there is conflict in a first time segment (e.g., time m), the second determining module 306 determines that the first network device A is affected by IS200a in the first time segment (e.g., time m). Namely, the data transmission between the first network device A and the desired client is affected by signal interference from IS200a in time m. If there is no conflict on a second time segment (e.g., time n), the second determining module 306 determines that the first network device A is not affected by signal interference from IS200a in time n. Namely, the data transmission between the first network device A and the desired client is not affected by signal interference from IS200a in time n.

In the embodiment, the first network device A connects with the first clients 100a and 100b. In other words, the first clients 100a and 100b are receiving objects or transmitting objects of the first network device A. When predetermining that the first network device A communicates with a third client (e.g., 100b) of the first clients at a time segment according to the first communication schedule, the third client (e.g., 100b) is called a desired (scheduled) client at the time segment.

The adjusting module 308 adjusts the first communication schedule according to the result of determination of the second determining module 306. When the second determining module 306 determines that data transmission between the first network device A and the desired client is affected by signal interference from IS200a in time m, the adjusting module 308 performs beam forming process for directing a coherence beam toward the desired client and directing a null beam toward IS200a, for obtaining a first pre-coding matrix during time m.

Figure 5:
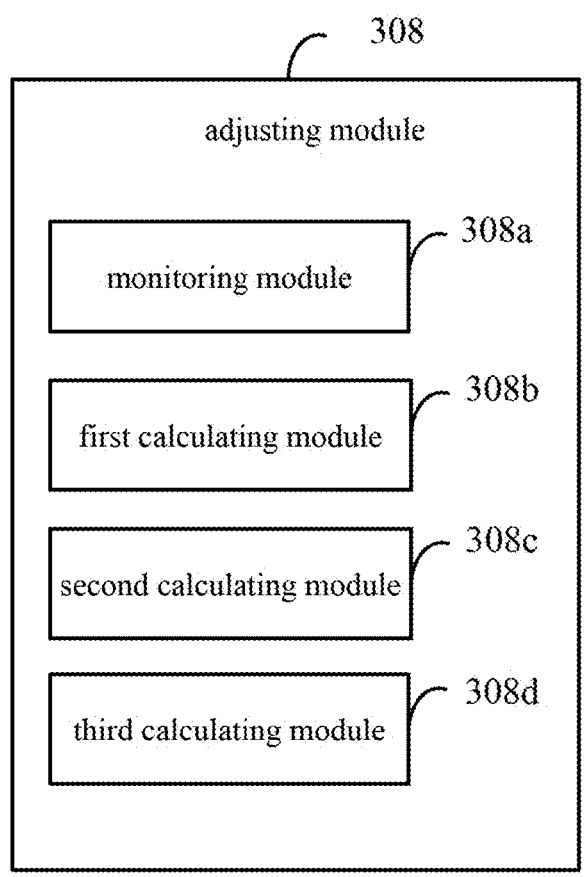
FIG. 5 illustrates a block diagram of an embodiment of sub-modules of functional module of an adjusting module of the network device of FIG. 4 in accordance with the present disclosure.

The first network device A may include a plurality of antennas. Referring to FIG. 5, the adjusting module 308 includes a monitoring module 308a, a first calculating module 308b, a second calculating module 308c, and an third calculating module 308d.

The monitoring module 308a monitors packets from the desired client and packets from IS200a to retrieve first CSI between each of the antennas and the desired client and second CSI between each of the antennas and IS200a.

The first calculating module 308b calculates a null-space corresponding to IS200a based on the second CSI between each of the antennas and IS200a.

The second calculating module 308c calculates a coherence beam-forming matrix corresponding to the desired client based on the first CSI between each of the antennas and the desired client.

The third calculating module 308d projects the coherence beam-forming matrix onto the null space to generate a vector matrix, wherein the vector matrix is regarded as the first pre-coding matrix.

In one embodiment, when the second determining module 306 determines that data transmission between the first network device A and the desired client is affected by signal interference from IS200a in time m, the adjusting module 308 adjusts transmitting times or queuing for the desired client to enable the first network device A not to communicate with the desired client in the time m.

In one embodiment, when the second determining module 306 determines that data transmission between the first network device A and the desired client is not affected by signal interference of IS200a during the time n, the adjusting module 308 performs beam forming process for directing to a coherence beam toward the desired client but does nothing toward IS200a, for obtaining a second pre-coding matrix in time n.

In one embodiment, when the second determining module 306 determines that data transmission between the first network device A and the desired client is not affected by signal interference from IS200a during the time n, the adjusting module 308 switches data transmitting object from the desired client to another client of the first clients during time n.

The third communication module 310 transmits the first client list and the first communication schedule to the second network device B, and the second network device B is able to adjust the second communication schedule based on the first client list and the first communication schedule.

When a unicast transmission is enabled between the first network device A and the desired client and between the second network device B and IS200a, the setting module 312 terminates CSMA/CA mechanism, and synchronizes a first rollback count value of the first network device A with a second rollback count value of the second network device B, or resets the first rollback count value and the second rollback count value to zero.

The setting module 312 also sets time of AIFS to a sum of time of DIFS and ½ time of CW.

Figure 6:
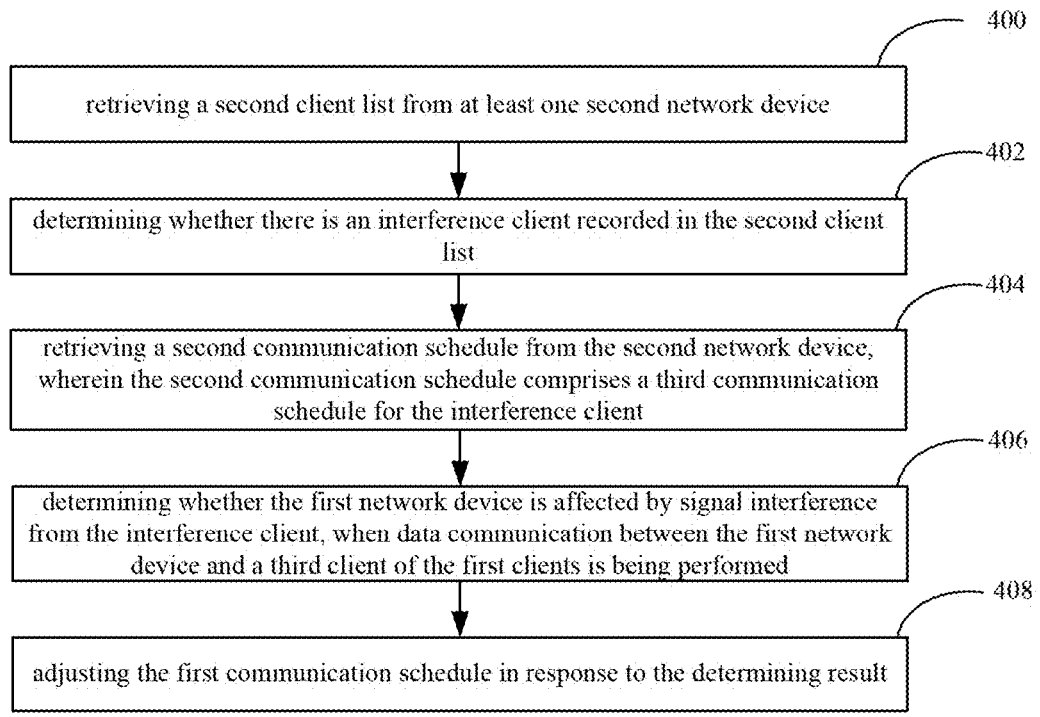
FIG. 6 illustrates a flowchart of an embodiment of a data communication method in accordance with the present disclosure.

FIG. 6 illustrates a flowchart of an embodiment of a communication method in accordance with the present disclosure. The communication method is provided by way of example, as there are a variety of ways to carry out the method. The method described below can be carried out using the first network device illustrated in FIG. 3, for example, and various elements of these figures are referenced in explaining the processing method. The first network device is not to limit the operation of the method, which also can be carried out using other devices. Each step shown in FIG. 6 represents one or more processes, methods, or subroutines, carried out in the exemplary processing method. Additionally, the illustrated order of blocks is by example only and the order of the blocks can change. The communication method begins at block 400.

The first network device A includes a first communication schedule and a first client list. The first client list records one or more first clients which are in connection with the first network device A.

At block 400, the first network device A retrieves a second client list from at least one nearby second network device (e.g., B). The second client list records one or more second clients (e.g., 200a, 200b) which are in connection with the second network device B. In the embodiment, the first network device A can broadcast probe packets in an signal coverage area to search for other network device (e.g., second network device B), receive feedback from the second network device B, and retrieve information from the second network device B under the scope of permission, for example, a first client list recoding one or more second clients (e.g., 200a, 200b) connecting with the second network device B.

At block 402, the first network device A determines whether there is an interfering client (e.g., IS200a) for the first network device A in the second client list. If yes, the flowchart goes to block 404; if no, the flowchart ends.

At block 404, the first network device A retrieves a second communication schedule from the second network device B, the second communication schedule includes a third communication schedule for IS200a. The third communication schedule can indicates time segments during which the second network device B plans to communicate with the interfering client (e.g. IS200a, that is a interference client for the first network device A, but a transmission object for the second network device B) for data transmission.

At block 406, the first network device A determines whether the first network device A is affected by IS200a, based on the first communication schedule and the third communication schedule, when data communication between the first network device and a third client of the first clients is being performed.

At block 408, the first network device A adjusts the first communication schedule according to the result of determination of the block 408.

Figure 7:
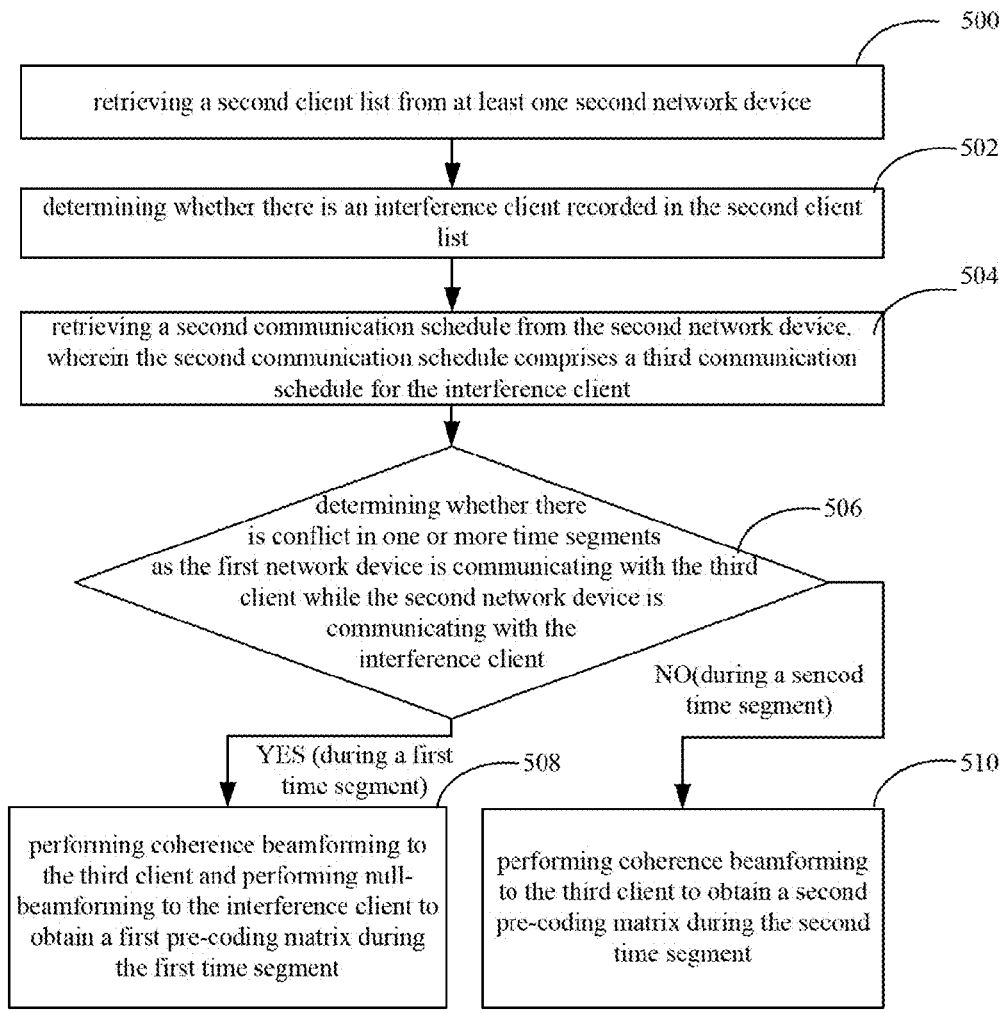
FIG. 7 illustrates a flowchart of another embodiment of a data communication method in accordance with the present disclosure.

FIG. 7 illustrates a flowchart of another embodiment of a communication method in accordance with the present disclosure.

At block 500, the first network device A retrieves a second client list from at least one nearby second network device (e.g., B). The second client list records one or more second clients (e.g., 200a, 200b) which are in connection with the second network device B.

At block 502, the first network device A determines whether there is an interfering client (e.g., IS200a) for the first network device A in the second client list. If yes, the flowchart goes to block 504; if no, the flowchart ends.

At block 504, the first network device A retrieves a second communication schedule from the second network device B. The second communication schedule includes a third communication schedule for IS200a.

At block 506, the first network device A determines whether the first network device A is affected by signal interference from IS200a when data communication between the first network device and a third client (e.g., 100a or 100b) of the first clients is being performed. If yes during a first time segment, the flowchart goes to block 508; if no during a second time segment, the flowchart goes to block 510.

At block 508, the first network device A performs coherence beamforming to the third client (e.g., 100a or 100b) and performs null-beamforming to the interference client to obtain a first pre-coding matrix at the first time segment.

In one embodiment, if a unicast transmission is carried out, the first network device A can terminate CSMA/CA mechanism, and synchronize a first rollback count value of the first network device A with a second rollback count value of the second network device B, or reset the first rollback count value and the second rollback count value to a to zero. In one embodiment, the first network device A can set time of AIFS to a sum of time of DIFS and ½ time of CW.

At block 510, the first network device A performs coherence beamforming to the third client (e.g., 100a or 100b) to obtain a second pre-coding matrix in the second time segment.

Figure 8:
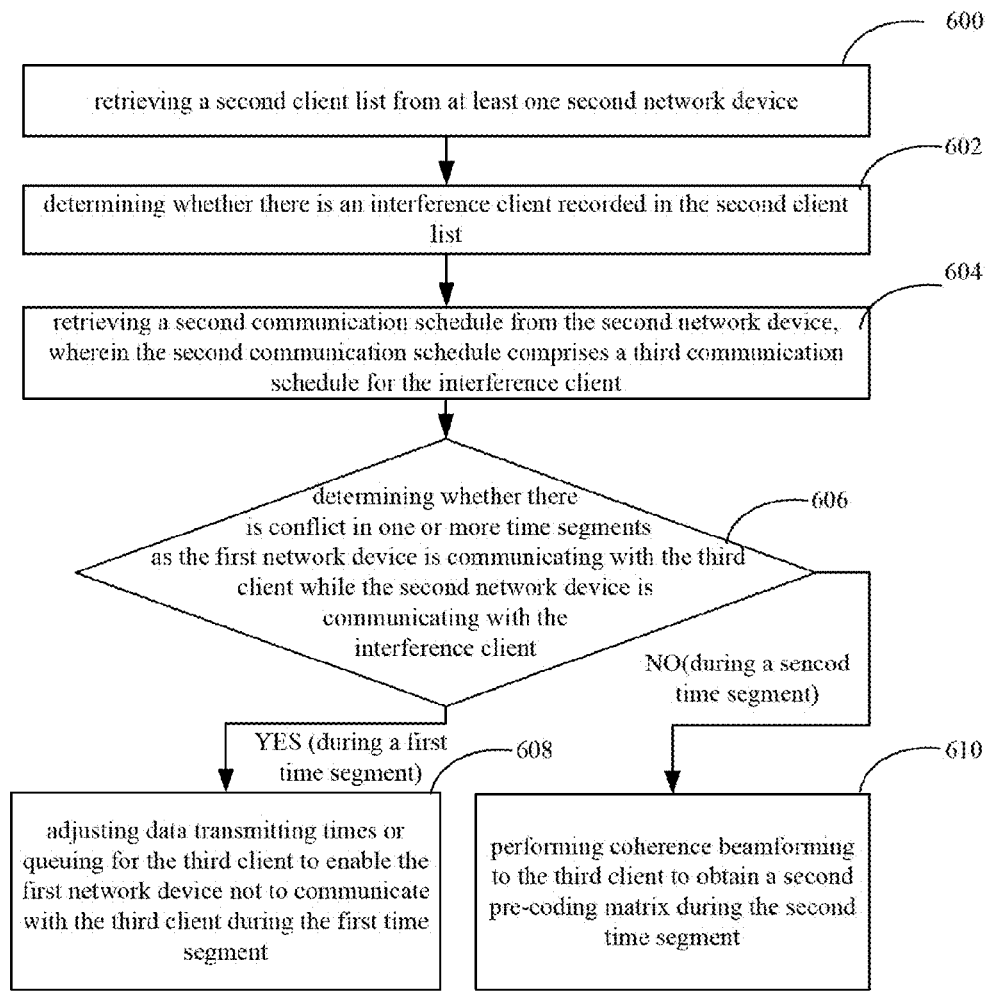
FIG. 8 illustrates a flowchart of another embodiment of a data communication method in accordance with the present disclosure.

FIG. 8 illustrates a flowchart of another embodiment of a communication method in accordance with the present disclosure. The blocks 600, 602, 604, 606 and 610 are respective corresponding to and similar to the blocks 500, 502, 504, 506 and 510.

At blocks 600-604, please reference to blocks 500-504.

At block 606, the first network device A determines whether the first network device A is affected by signal interference from IS200a when the first network device A is communicating with a third client (e.g., 100a or 100b) of the first clients. If yes during a first time segment, the flowchart goes to block 608; if no during a second time segment, the flowchart goes to block 610.

At block 608, the first network device A the first network device A adjusts transmitting times or queuing for the third client (e.g., 100b) to enable the first network device A not to communicate with the third client (e.g., 100b) in the first time segment.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A data communication method, applied in a first network device comprising a first communication schedule and a first client list, the first client list recording one or more first clients connecting with the first network device, the method comprising:
   retrieving a second client list from a second network device, wherein the second client list records one or more second clients connecting with the second network device;
   determining whether there is an interference client recorded in the second client list, wherein the interference client is located in signal coverage of the first network device;
   retrieving a second communication schedule from the second network device, wherein the second communication schedule comprises a third communication schedule for the interference client;
   determining whether the first network device is affected by signal interference from the interference client, based on the first communication schedule and the third communication schedule, when data communication between the first network device and a third client of the first clients is being performed; and
   adjusting the first communication schedule in response to the determining result.

2. The method as claimed in claim 1, wherein the step of determining whether the first network device is affected by signal interference from the interference client further comprises:
   determining whether there is conflict in one or more time segments as the first network device is communicating with the third client while the second network device is communicating with the interference client;
   if there is conflict in a first time segment, determining that the first network device is affected by signal interference from the interference client in the first time segment; and
   if there is no conflict in a second time segment, determining that the first network device is not affected by signal interference from the interference client in the second time segment.

3. The method as claimed in claim 2, the adjusting step further comprises:
   when the first network device is affected by signal interference from the interference client in the first time segment, performing coherence beamforming to the third client and performing null-beamforming to the interference client to obtain a first pre-coding matrix during the first time segment.

4. The method as claimed in claim 3, wherein the first network device comprises one or more antennas, the step of obtaining the first pre-coding matrix further comprises:

monitoring packets from the third client and packets from the interference client to retrieve channel status information (CSI) between each of the antennas and the third client and CSI between each of the antennas and the interference client;

calculating a null-space corresponding to the interference client based on the CSI between each of the antennas and the interference client;

calculating a coherence beamforming matrix corresponding to the third client based on the CSI between each of the antennas and the third client; and projecting the coherence beam-forming matrix onto the null space to generate a vector matrix, wherein the vector matrix is regarded as the first pre-coding matrix.

5. The method as claimed in claim 2, wherein the adjusting step further comprises:

when the first network device is affected by signal interference from the interference client in the first time segment, adjusting data transmitting times or queuing for the third client to enable the first network device not to communicate with the third client in the first time segment.

6. The method as claimed in claim 2, wherein t the adjusting step further comprises:

when the first network device is not affected by signal interference from the interference client in the second time segment, performing coherence beamforming to the third client to obtain a second pre-coding matrix during the second time segment.

7. The method as claimed in claim 2, wherein the adjusting step further comprises:

when the first network device is not affected by signal interference from the interference client at the second time segment, adjusting data transmitting times or queuing for the other client of the first clients in the second time segment.

8. The method as claimed in claim 2, wherein further comprising:

when a unicast transmission is enabled between the first network device and the third client and between the second network device and the interference client, terminating a carrier sense multiple access with collision avoidance (CSMA/CA) mechanism, and synchronizing a first rollback count value of the first network device with a second rollback count value of the second network device or resetting the first rollback count value and the second rollback count value to zero.

9. The method as claimed in claim 8, further comprising: setting time of arbitration inter-frame spacing (AIFS) to a sum of time of distributed inter-frame spacing (DIFS) and half of time of contention window (CW).

10. The method as claimed in claim 1, further comprising: transmitting the first client list and the first communication schedule to the second network device; and enabling the second network device to adjust the second communication schedule based on the first client list and the first communication schedule.

11. A network device, the device comprising:

at least one processor;

a storage system, which stores a first communication schedule and a first client list, the first client list recording one or more first clients connecting with the network device; and one or more programs that are stored in the storage system and executed by the at least one processor, the one or more programs comprising instructions for:

retrieving a second client list from a second network device, wherein the second client list records one or more second clients connecting with the second network device;

determining whether there is an interference client recorded in the second client list, wherein the interference client is located in signal coverage of the network device;

retrieving a second communication schedule from the second network device, wherein the second communication schedule comprises a third communication schedule for the interference client;

determining whether the network device is affected by signal interference from the interference client, based on the first communication schedule and the third communication schedule, when data communication between the network device and a third client of the first clients is being performed; and adjusting the first communication schedule in response to the determining result.

12. The device as claimed in claim 11, wherein the instruction of determining whether the network device is affected by the signal interference from the interference client, further comprises:

determining whether there is conflict in one or more time segments as the network device is communicating with the third client while the second network device is communicating with the interference client;

if there is conflict in a first time segment, determining that the network device is affected by signal interference from the interference client in the first time segment; and if there is no conflict in a second time segment, determining that the network device is not affected by signal interference from the interference client in the second time segment.

13. The device as claimed in claim 12, the instruction of adjusting further comprises:

when the network device is affected by signal interference from the interference client in the first time segment, performing coherence beamforming to the third client and performing null-beamforming to the interference client to obtain a first pre-coding matrix during the first time segment.

14. The device as claimed in claim 13, wherein the network device comprises one or more antennas, the instruction of obtaining the first pre-coding matrix further comprises:

monitoring packets from the third client and packets from the interference client to retrieve CSI between each of the antennas and the third client and CSI between each of the antennas and the interference client;

calculating a null-space corresponding to the interference client based on the CSI between each of the antennas and the interference client;

calculating a coherence beam-forming matrix corresponding to the third client based on the CSI between each of the antennas and the third client; and projecting the coherence beam-forming matrix onto the null space to generate a vector matrix, wherein the vector matrix is regarded as the first pre-coding matrix.

15. The device as claimed in claim 12, wherein the adjusting step further comprises:

when the network device is affected by signal interference from the interference client in the first time segment, adjusting data transmitting times or queuing for the third client to enable the network device not to communicate with the third client in the first time segment.

16. The device as claimed in claim 12, wherein t the instruction of adjusting further comprises:
when the network device is not affected by signal interference from the interference client in the second time segment, performing coherence beamforming to the third client to obtain a second pre-coding matrix during the second time segment.

17. The device as claimed in claim 12, wherein the instruction of adjusting further comprises:
when the network device is not affected by signal interference from the interference client at the second time segment, adjusting data transmitting times or queuing for the other client of the first clients in the second time segment.

18. The device as claimed in claim 12, wherein t the instruction of adjusting further comprises:
when a unicast transmission is enabled between the network device and the third client and between the second network device and the interference client, terminating a CSMA/CA mechanism, and synchronizing a first rollback count value of the network device with a second rollback count value of the second network device, or resetting the first rollback count value and the second rollback count value to zero.

19. The device as claimed in claim 18, wherein further comprising instructions for:
setting time of AIFS to a sum of time of DIFS and half of time of CW.

20. The device as claimed in claim 11, wherein further comprising instructions for:
transmitting the first client list and the first communication schedule to the second network device; and
enabling the second network device to adjust the second communication schedule based on the first client list and the first communication schedule.

* * * * *